April 23, 1946.                H. HANSEN ET AL                2,399,115
                                PRESSURE COOKER
                         Filed May 20, 1944         2 Sheets-Sheet 1

Inventors
Roy Pilger
Harold Hansen

April 23, 1946. H. HANSEN ET AL 2,399,115
PRESSURE COOKER
Filed May 20, 1944 2 Sheets-Sheet 2
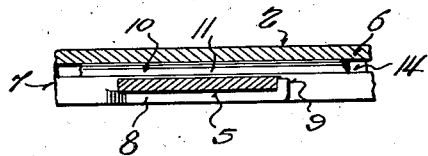
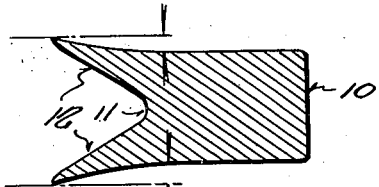
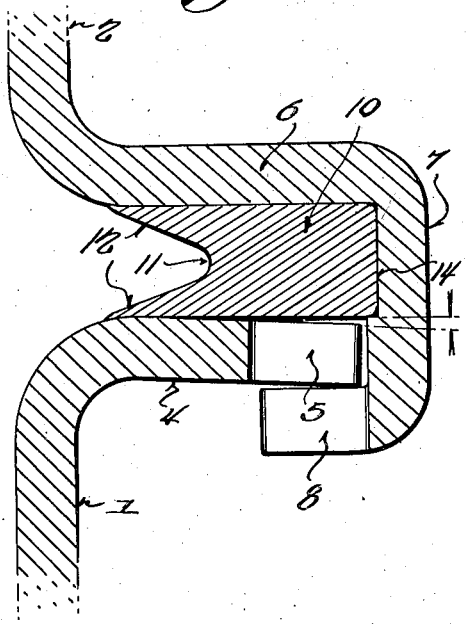
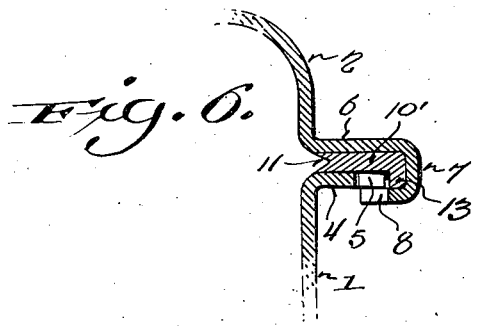
Inventors:
Roy Pilger_
Harold Hansen_

Patented Apr. 23, 1946

2,399,115

UNITED STATES PATENT OFFICE 2,399,115

PRESSURE COOKER

Harold Hansen and Roy Pilger, Manitowoc, Wis., assignors to Aluminum Goods Mfg. Co., Manitowoc, Wis.

Application May 20, 1944, Serial No. 536,522

4 Claims. (Cl. 220—46)

This invention pertains to pressure cookers, and more particularly to the manner of effecting a tight seal between the cover and receptacle.

The art of pressure cookers is highly developed, and amongst other structures, the use of interlocking bayonet cam lugs on the cover and receptacle in combination with a flexible sealing gasket, is shown to be old. However, in all such structures a camming action between the lugs is relied upon to create initial tension upon the gasket as the cover is rotated upon the receptacle, to provide a preliminary seal prior to development of sufficient pressure within the cooker for effectively sealing the cooker against operating pressure.

Naturally, the foregoing structures create considerable friction on the gasket during rotation of the cover, which requires a substantial effort to both lock and release the cover, and results in wear and rapid deterioration of the gasket.

The present invention has primarily for its object to overcome the foregoing objections by the provision of a self-sealing gasket disposed between the cover and receptacle of a pressure cooker, and in which the weight of the cover creates sufficient tension upon the gasket to allow initial pressure to build up, after which the increased pressure expands the gasket into tight sealing engagement with the cover and receptacle.

Incidental to the foregoing, a more specific object of the invention resides in the provision of a flexible self-sealing gasket provided with an inner peripheral groove forming upper and lower annular lips extending slightly beyond the respective upper and lower faces of the gasket to create slight tension between the lips and receptacle through the weight of the cover.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the hereindisclosed invention may be made as come within the scope of the claims.

In the accompanying drawings are illustrated one complete example of the physical embodiment of the present invention constructed according to the best mode so far devised for the practical application of the principles thereof.

In the drawings:

Fig. 3 is a fragmentary detail sectional view taken on the line 3—3 of Fig. 2 illustrating the stop for limiting rotation of the cover on the receptacle;

Fig. 4 is an enlarged sectional view of the gasket in its normal condition;

Fig. 5 is a similar view illustrating the condition of the gasket in operative position; and Fig. 6 is a fragmentary detail section illustrating a modification of the invention.

Figure 1:
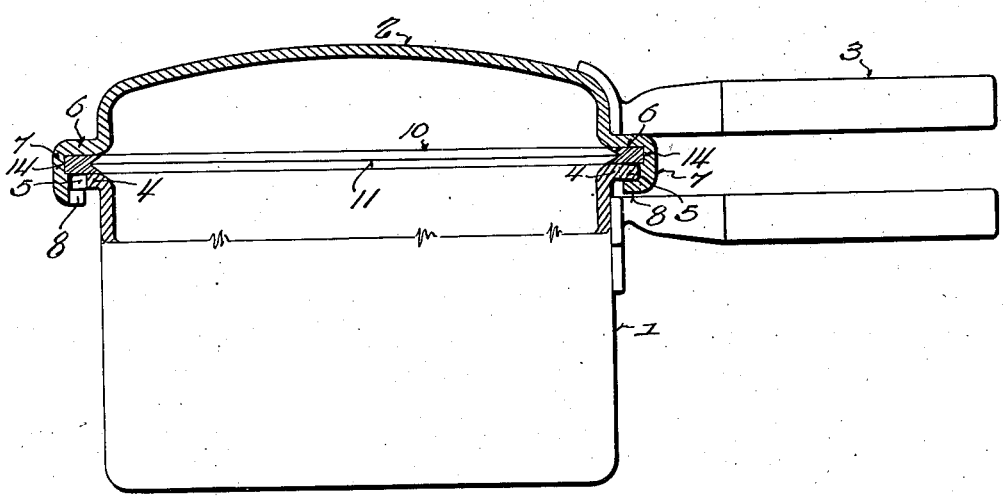
Fig. 1 is a side elevational view of a pressure cooker incorporating the principles of the present invention, parts being broken away and in section to more clearly illustrate structural details.

Referring now more particularly to the accompanying drawings, the selected form of the invention illustrated includes a receptacle 1, and a cover 2 provided with suitable radially extending handles 3, which in the locked position of the cover are preferably in vertical alinement to facilitate handling of the cooker.

While various arrangements of interlocking lugs may be employed for the purpose of the present invention, one conventional structure is illustrated, in which the upper edge of the receptacle 1 is provided with an outwardly extending flange 4 provided with spaced peripheral lugs 5.

Extending outwardly from the lower edge of the cover 2, and opposed to the flange 4, is an annular flange 6 terminating in a depending skirt 7 surrounding the lugs 5 formed on the receptacle, and provided with spaced inwardly projecting lugs 8 for locking engagement under the lugs 5.

Figure 2:
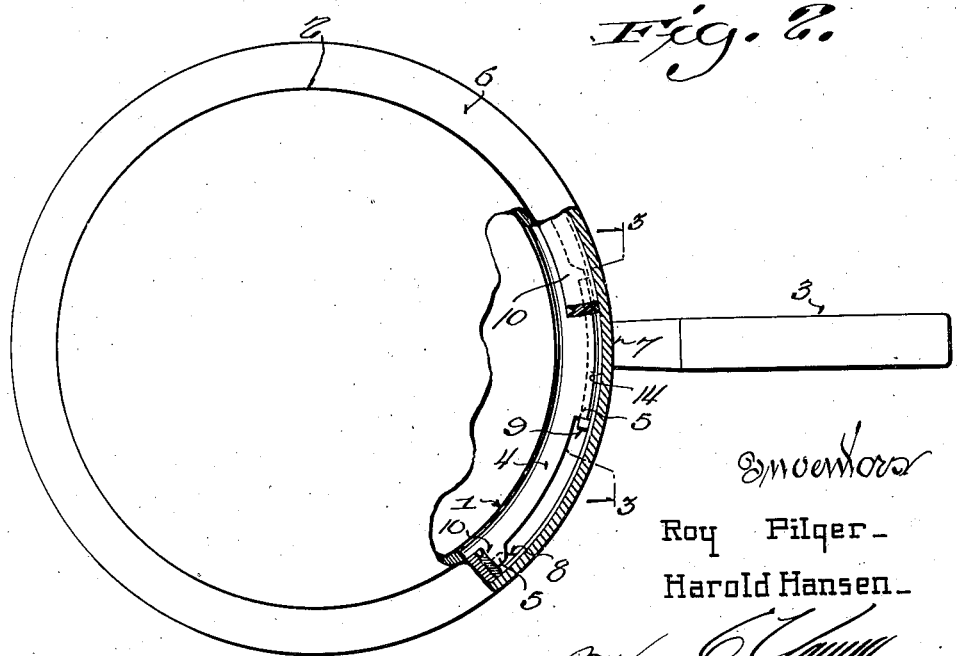
Fig. 2 is a plan view with parts broken away and in section.

The lugs 5 and 8 may be equidistantly spaced as shown in Fig. 2, the length of the lugs being preferably slightly shorter than the notches or spaces between the lugs, to facilitate seating of the cover on the receptacle.

To limit rotary movement of the cover on the receptacle, in both released and locked positions, an end of one of the lugs 8 is bent upwardly to form a stop 9, for engaging the ends of a set of adjacent lugs 5 formed on the receptacle flange 4.

The foregoing structure is more or less conventional and may be varied as suggested, therefore, the same forms no part of the present invention other than as set forth in the combinations included in the appended claims.

The salient feature of the invention resides in the novel structure of the self-sealing gasket 10 disposed between the opposed flanges 4 and 6 of the receptacle and cover, respectively. The gasket 10 is formed of resilient material such as rubber or similar composition.

As best shown in Figs. 4 and 5 the inner periphery of the gasket 10 is provided with an annular groove 11, preferably of V shape and tapered outwardly to provide substantially feather edges at the top and bottom faces of the gasket. In its normal condition the gasket is so constructed that the upper and lower lips 12 extend respectively beyond the top and bottom faces of the gasket, and when the cover is positioned on a receptacle, as shown in Fig. 5, the lips 12, because of the resiliency of the gasket material, are relatively compressed by the mere weight of the cover to create sufficient tension between the lips of the gasket, and the cover and receptacle flanges, to provide a preliminary seal that allows pressure to be built up within the receptacle, to a maximum operating point, which forces the lips 12 apart to effect secure sealing of the receptacle under operative pressure, it being understood that in operative position the cover is locked on the receptacle by the alined lugs 5 and 8, with the handles in alined position as shown in Figs. 1 and 2.

While the gasket 10 would be normally held within the skirt 7 of the cover when removed from the receptacle by the lugs 5, to prevent vertical shifting of the gasket, a shallow groove 14 is formed on the interior of the skirt for reception of the outer edge of the gasket, thus insuring its proper position at all times with relation of the cover and receptacle flanges.

Also to prevent undue friction between the gasket and receptacle, which might cause puckering of the gasket upon rotation of the cover, it is proposed to slightly incline the receptacle flange 4 downwardly from the top edge of the receptacle as best shown in Fig. 5, which materially reduces the extent of contact between the gasket and receptacle without affecting the sealing function.

It will be understood that the cover of applicant's cooker will be provided with the usual pressure gauge and relief valve (not shown).

As clearly shown in Figure 5, a substantial portion of the gasket 10 is unsupported by the peripheral lugs 5 and the lugs 8 which are aligned with the lugs 5 when the cover is assembled on the receptacle for use. The bottom of the groove 11 in the gasket is spaced inwardly from the unsupported area and the gasket is sufficiently stiff so that the gasket will not blow out through the unsupported areas under normal operating pressures. The usual relief valve, if functioning properly, will blow out if the internal pressure should rise above a safe point. However, the gasket and its unsupported areas serve as a secondary safety feature. Before internal pressure reaches a point which might rupture the walls of the container itself and cause a dangerous explosion, the gasket sections which are unsupported will blow out through the spaces between the aligned lugs 5 and 8. Such a blow out is not dangerous to persons nearby as it is directed downwardly adjacent the receptacle walls.

In the modified form of the invention illustrated in Fig. 6, a slight space is provided between the outer edges of the receptacle lugs 5 and the cover skirt 7 to receive a depending rim 13 formed on the outer edge of the gasket 10', which serves to hold the gasket against vertical shifting within the cover.

From the foregoing explanation considered in connection with the accompanying drawings, it will be apparent that an exceedingly simple and effective seal has been provided for pressure cookers, in which the sealing operation is effective solely by the pressure generated within the receptacle, thus eliminating the necessity of cams, which cause wear and rapid deterioration of the gaskets, as well as interfering with the easy operation of the cover during locking and release.

Another advantage derived from the present invention resides in the safety factor resulting from the fact that as long as any appreciable pressure exists within the cooker, sufficient friction is maintained between the gasket and the cover and receptacle to prevent rotation and release of the cover. This avoids the danger of burning or scalding by premature removal of the cover.

We claim:

1. In a pressure cooker including a receptacle and a cover, opposed radial flanges formed on said receptacle and cover, said receptacle flange being inclined slightly downwardly from its inner edge, lugs carried by said flanges for interlocking engagement upon rotation of the cover, the lugs on the receptacle flange being on the periphery thereof and inclined downwardly in continuation of the receptacle flange, and a resilient gasket disposed between the cover and receptacle, the gasket having an outer peripheral portion with substantially parallel upper and lower faces, said portion being of less thickness than the distance between the outer portions of the opposed radial flanges, and having its outer peripheral edge substantially co-extensive with the outer peripheral edges of the lugs, said gasket having an inner peripheral groove exposed to the interior of the cooker and forming upper and lower annular lips normally extending slightly beyond the upper and lower faces of the gasket and relatively contractible by the weight of the cover.

2. In a pressure cooker including a receptacle and a cover, a radial flange formed on said receptacle and being inclined slightly downwardly from its inner edge, said cover having an opposed radial flange terminating in a depending skirt surrounding the receptacle flange and provided with an annular groove in its inner face spaced from the bottom of said skirt, outwardly projecting lugs formed on the periphery of the receptacle flange and inclined downwardly in continuation of said flange, inwardly projecting lugs formed on said skirt for interlocking engagement under the receptacle lugs upon rotation of the cover on the receptacle, and a resilient gasket disposed between the cover and receptacle and seated within the annular groove of said skirt, the body of the gasket being supported by its seat spaced from the outer downwardly inclined portion of the radial flange on the receptacle, said gasket extending inwardly and substantially covering the opposed radial flanges and having an inner peripheral groove exposed to the interior of the cooker and forming upper and lower annular lips normally extending slightly beyond the upper and lower faces of the gasket and relatively contractible by the weight of the cover.

3. In a pressure cooker including a receptacle and a cover, an outwardly extending radial flange on the receptacle, the cover being formed with an opposed radial flange terminating in a depending skirt surrounding the receptacle flange, spaced outwardly projecting radial lugs formed on the receptacle flange, inwardly projecting lugs extending from the skirt for interlocking engagement under the receptacle lugs upon rotation of the cover upon the receptacle, and a resilient gasket disposed between the cover and receptacle and seated upon and substantially covering the receptacle flange, the gasket extending over the lugs formed on said flange and having its outer face engaging the inner face of the skirt on the cover, the outer portion of the lower face of the gasket being unsupported over the space between the lugs, the gasket having sufficient rigidity to maintain its sealing position under normal operating pressures.

4. In a pressure cooker including a receptacle and a cover, an outwardly extending radial flange on the receptacle, the cover being formed with an opposed radial flange terminating in a depending skirt surrounding the receptacle flange, spaced outwardly projecting radial lugs formed on the receptacle flange, inwardly projecting lugs extending from the skirt for interlocking engagement under the receptacle lugs upon rotation of the cover upon the receptacle, and a resilient gasket disposed between the cover and receptacle and seated upon and substantially covering the receptacle flange, said gasket having a peripheral groove on its inner face exposed to the interior of the cooker and forming upper and lower annular lips engaging the receptacle and cover flanges, the base of the groove being located inwardly of the outer edge of the receptacle flange, the gasket extending over the lugs formed on said flange and having its outer face engaging the inner face of the skirt on the cover, the outer portion of the lower face of the gasket being unsupported over the space between the lugs, the gasket having sufficient rigidity to maintain its sealing position under normal operating pressures.

HAROLD HANSEN.
ROY PILGER.